United States Patent
Mannava et al.

(10) Patent No.: US 10,917,198 B2
(45) Date of Patent: Feb. 9, 2021

(54) TRANSFER PROTOCOL IN A DATA PROCESSING NETWORK

(71) Applicant: Arm Limited, Cambridge (GB)

(72) Inventors: Phanindra Kumar Mannava, Austin, TX (US); Bruce James Mathewson, Papworth Everard (GB); Jamshed Jalal, Austin, TX (US); Tushar P. Ringe, Austin, TX (US)

(73) Assignee: Arm Limited, Cambridge (GB)

( * ) Notice: Subject to any disclaimer, the term of this patent is extended or adjusted under 35 U.S.C. 154(b) by 200 days.

(21) Appl. No.: 16/027,864

(22) Filed: Jul. 5, 2018

(65) Prior Publication Data

US 2019/0342034 A1    Nov. 7, 2019

Related U.S. Application Data

(60) Provisional application No. 62/666,256, filed on May 3, 2018.

(51) Int. Cl.
*H04L 29/08* (2006.01)
*H04L 1/16* (2006.01)

(52) U.S. Cl.
CPC ............ *H04L 1/16* (2013.01); *H04L 67/2842* (2013.01)

(58) Field of Classification Search
CPC .................................................. G06F 12/0833
See application file for complete search history.

(56) References Cited

U.S. PATENT DOCUMENTS

| | | | | |
|---|---|---|---|---|
| 2007/0204111 A1* | 8/2007 | Khare | ................ | G06F 12/0817 711/146 |
| 2009/0113139 A1* | 4/2009 | Pudipeddi | ........... | G06F 12/0817 711/146 |
| 2010/0005246 A1* | 1/2010 | Beers | ................ | G06F 12/0831 711/146 |
| 2011/0078384 A1* | 3/2011 | Kumar | ................ | G06F 12/0817 711/143 |
| 2012/0079211 A1* | 3/2012 | Laycock | ............ | G06F 12/0833 711/143 |
| 2013/0042077 A1* | 2/2013 | Mannava | ............ | G06F 12/0831 711/146 |
| 2013/0151929 A1* | 6/2013 | Dodson | ............... | G06F 11/1076 714/766 |
| 2015/0261677 A1* | 9/2015 | Malewicki | .......... | G06F 12/0831 711/146 |

* cited by examiner

*Primary Examiner* — Sm A Rahman
*Assistant Examiner* — Dae Kim
(74) *Attorney, Agent, or Firm* — Leveque IP Law, P.C.

(57) ABSTRACT

In a data processing network comprising one or more Request Nodes and a Home Node coupled via a coherent interconnect, a Request Node requests data from the Home Node. The requested data is sent, via the interconnect, to the Request Node in a plurality of data beats, where a first data beat of the plurality of data beats is received at a first time and a last data beat is received at a second time. Responsive to receiving the first data beat, the Request Node sends an acknowledgement message to the Home Node. Upon receipt of the acknowledgement message, the Home Node frees resources allocated to the read transaction. In addition, the Home Node is configured to allow snoop requests for the data to the Request Node to be sent to the Request Node before all beats of the requested data have been received by the Request Node.

19 Claims, 7 Drawing Sheets

TRANSFER PROTOCOL IN A DATA PROCESSING NETWORK

RELATED APPLICATIONS

This application claims the benefit of provisional application Ser. No. 62/666,256 filed May 3, 2018 and titled 'TRANSFER PROTOCOL IN A DATA PROCESSING NETWORK', the entire content of which is hereby incorporated by reference.

BACKGROUND

A multi-processor data processing system may be arranged as an on-chip network with nodes of various types, such as processors, accelerators, IO, and memory connected via a coherent interconnect. At a high level, there are three basic node types, requestor, home and slave. A Request Node (RN) is a node that generates protocol transactions, including reads and writes, to the interconnect. These nodes could be fully coherent processors or IO coherent devices. A Home Node (HN) is a node that receives protocol transactions from RNs. Each address in the system has a Home which acts as the Point-of-Coherency (PoC) and Point of Serialization (PoS) for requests to that address. In a typical implementation, Homes for a range of addresses are grouped together as a Home Node. Each of these Home Nodes may include a system level cache and/or a snoop filter to reduce redundant snoops.

A Slave Node (SN) is a node that receives and completes requests from the HNs. An SN could be used from peripheral or main memory.

Data from a shared data resources may be accessed by a number of different processors and copies of the data may be stored in local caches for rapid access. A cache coherence protocol may be used to ensure that all copies are up to date. The protocol may involve the HN performing a coherency action that may include exchanging snoop messages with the RNs having copies of data being accessed.

The HN may serialize accesses to an address on a first-come, first-served basis. For example, access to a designated device and resources of the HN may be reserved until a current transaction has been completed. A disadvantage of this approach is that HN resources may be reserved for longer than necessary, which may adversely affect system performance.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide mechanisms for automatic routing and allocation of incoming data in a data processing system.

While this present disclosure is susceptible of embodiment in many different forms, there is shown in the drawings and will herein be described in detail specific embodiments, with the understanding that the present disclosure is to be considered as an example of the principles of the present disclosure and not intended to limit the present disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to a mechanism in a data processing network for speeding up a data fetch operation. The disclosed mechanism, in addition to reducing the life time of a data fetch transaction in the interconnect, also reduces the the number of resources required to fully utilize the interconnect components. In addition, the disclosed mechanism improves the throughput of the transactions in the interconnect by chaining request response pairs from different sources.

Figure 1:
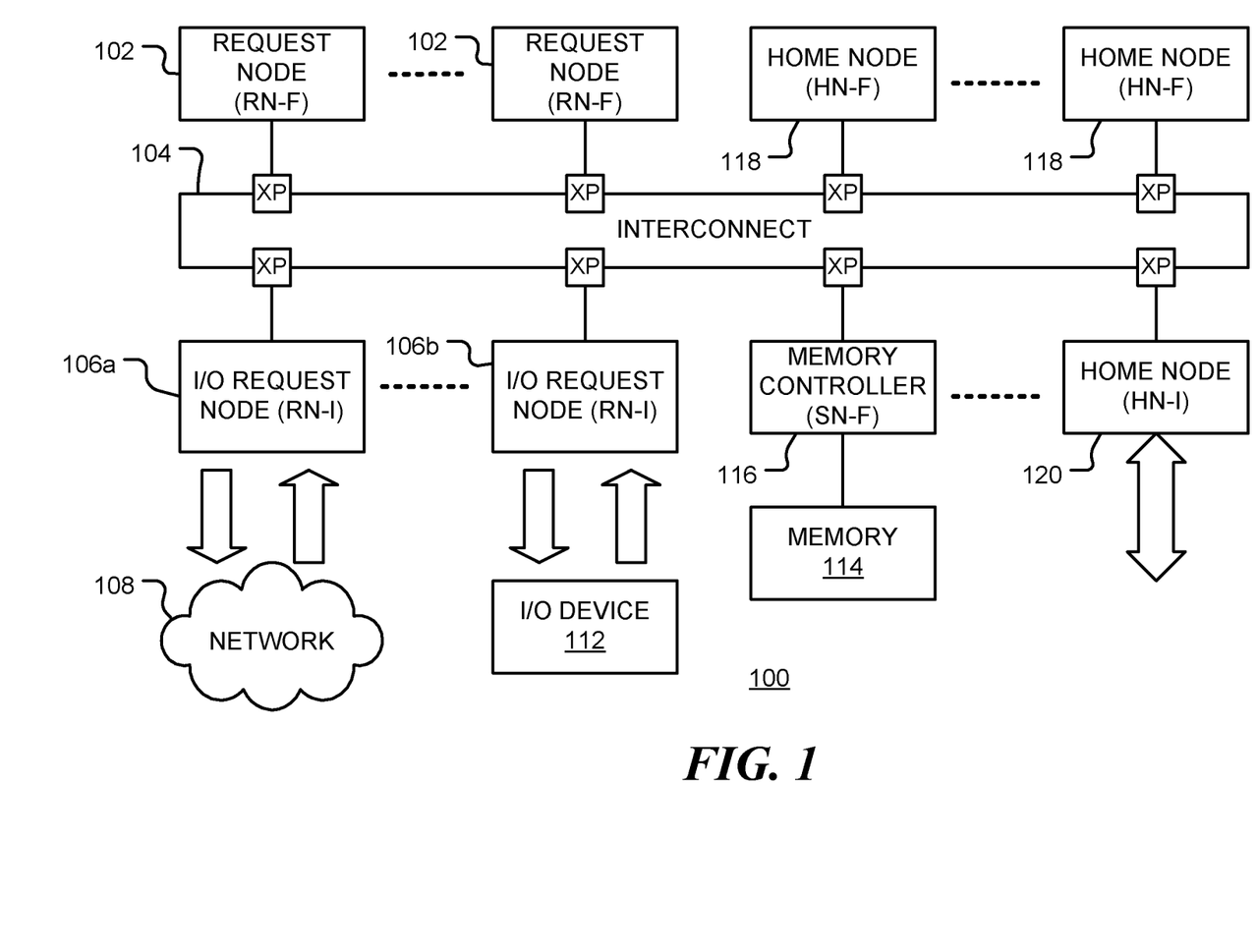
FIG. 1 is a block diagram of a data processing network, in accordance with various representative embodiments.

FIG. 1 is a block diagram of a data processing system 100, in accordance with various representative embodiments. A number of processing core clusters 102 (referred to as Request Nodes (RNs)) are coupled to data resources via coherent interconnect 104. Data is received via input/output (I/O) requesting nodes (RN-I). In the example shown, RN-I 106a comprises a network interface controller (NIC) that receives data from network 108 and RN-I 106b receives data from I/O device 112. I/O device 112 may be coupled via a peripheral component interconnect express (PCIe) bus, direct memory access (DMA) unit, or network accelerator, for example. Data may be stored in one or more memory or storage devices 114 that are coupled to coherent interconnect 104 via one or more memory controllers 116. Home Nodes (HNs) 118 and 120 may include system level caches. Each Home Node (HN) serves as a point of serialization and/or point of coherence for data stored at a given set of system addresses. A Home Node (HN-F), such as 118, may be a home for local resources. Alternatively, a Home Node (HN-I), such as 120, may provide an interface to off-chip resources or on-chip peripheral devices. Data requested by a Request Node 102 may be retrieved from a system level cache of the HN, from another Request Node, or from a memory 114 via a memory controller 116. The memory controllers are examples of Slave Nodes (SN's).

To avoid conflicts when multiple RNs try to access the same memory location, the Home Nodes 118 act as points of serialization, processing read requests and other transactions in a serial manner, such as first-come, first-served. Coherent interconnect 104 is used to transfer data over data (DAT) channels between nodes. In addition, a messaging protocol is used to control each access transaction, in which requests and responses are sent over REQ RSP channels in the interconnect. Finally, 'snoop' messages are sent over SNP channels in the interconnect to ensure data coherence.

An aspect of the present disclosure relates to an improved messaging and data transfer mechanism, implemented in the hardware of the nodes, that provides improved performance and efficiency of the data processing network.

In one embodiment, a data processing network comprises one or more Request Nodes (102) configured to access a shared data resource (e.g. 114), a Home Node (e.g. 118) that provides a point of coherency for data of the shared data resource and a coherent interconnect (104) configured to couple between the one or more request nodes and the Home Node. To read data at a first address in the shared data resource, a request node sends a request to the Home Node. For example, data may be transferred in blocks having the size of one cache line. When the DAT bus in the coherent interconnect has a width smaller than a cache line, the requested data is sent through the interconnect on the DAT channel as a plurality of individual data transfers, referred to as 'data beats' herein and in the Arm® AMBA® AXI communication protocol of Arm Limited. These data beats may take different paths through the interconnect and are not guaranteed to arrive in the order in which they were sent. For example, a first data beat of the plurality of data beats may be received at a first time and a last data beat received at a second time subsequent to the first time, but these beats may not correspond to the first and last beats passed to the interconnect.

In accordance with an aspect of the present disclosure, the request node sends an acknowledgement message to the Home Node in response to receiving the first data beat. In contrast, prior systems delay sending an acknowledgement until the last data beat has been received.

Subsequent to sending the acknowledgement message to the Home Node, the request node accepts snoop messages from the Home Node. The request node is configured to track when all requested data beats have arrived and treats snoops arriving in the interim in a different manner to other snoops. In contrast, in prior systems, the Request Nodes were configured to not send an acknowledgement until all data beats were received. This prevents Home Nodes from sending snoops during this period. Consequently, resources of the Home Node are utilized for a longer period of time.

The Home Node receives, at a third time, the request to read data at the first address and performs a coherence action for the data at the first address dependent upon a presence of copies of the requested data at various locations in the data processing network. The Home Node then causes the requested data to be transmitted to the request node in the plurality of data beats. At a fourth time, the acknowledgement message is received from the request node. In the time period between the third time and the fourth time, the Home Node does not send any snoop request to the Request Node for data at the first address. However, subsequent to the fourth time, the Home Node allows snoop requests for data at the first address to be sent to the Request Node.

In one embodiment, the Request Node may buffer a snoop request from the Home Node for the data at the first address when the snoop request is received in the time period between the first time and the second time. Data may be sent in response to the snoop request after the last data beat of the plurality of data beats has been received.

In a further embodiment, when a snoop request from the Home Node for the data at the first address is received in the time period between the first time and the second time, the Request Node forwards data beats of the requested data as they are received.

The Home Node is configured to allocate resources of the Home Node when the read request is received, and to free the resources when the acknowledgement message, acknowledging receipt of a first beat of the plurality of data beats, is received from the Request Node.

These mechanisms enable Home Node resources to be allocated for a shorter period of time, freeing the resources for other transactions. They also enable data to be shared between multiple Request Nodes with less latency.

Figure 2:
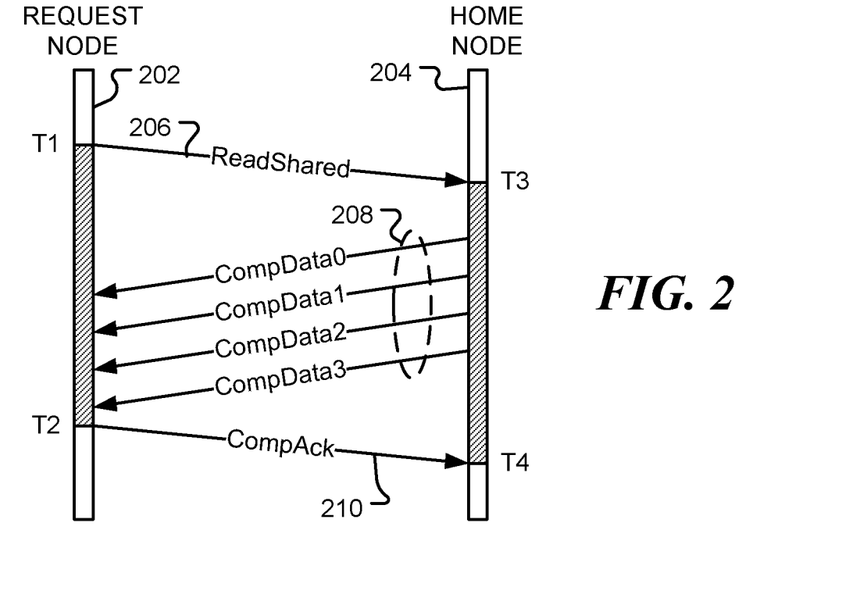
FIG. 2 is a transaction flow diagram for a conventional data access in a data processing network.

FIG. 2 is a transaction flow diagram for a conventional data access in a data processing network. In FIG. 2, vertical bars 202 and 204 show time lines for a Request Node (RN) and a Home Node (HN), respectively, with time flowing from top to bottom. At time T1, RN issues Read request 206 to the Home Node for the read address. Assuming the requested data is in the cache of the HN, the HN sends the requested data 208 (in four data beats, CompData0, CompData1, CompData2 and CompData3, in the example shown) to the RN. The 'CompData' message contains the data and an indication that transaction is complete with respect to that data. That is, the RN can consider the read transaction to be globally observed, as there is no action which can modify the read data received.

All communications are transmitted via the coherent interconnect. The data may be transmitted to the RN in multiple data beats across the interconnect. Once all of the requested data has been received by the RN, a completion acknowledgment (CompAck) message 210 is sent from the RN to the HN. Thus, the duration of the transaction is T1-T2 for the RN and T3-T4 for the HN. During the period T3-T4, the HN assigns resources for the transaction (such as a tracker). In addition, the HN refrains from sending snoop messages to the RN for the addresses accessed in the Read transaction. Otherwise, for example, a snoop request may arrive at the RN prior to the arrival of the data from the HN.

HN must wait for CompAck response 210, before sending a snoop, since the data and the snoop may take different paths through the interconnect, whereby the snoop arrives at the RN before some of the Data.

If the requested data is not present in the cache of the HN, the data is requested from a Slave Node (SN), such as a memory controller, I/O device or an off-chip data resource. The requested data may be sent directly from an SN (via the coherent interconnect), or sent via the HN (and the coherent interconnect) to the RN.

Figure 3:
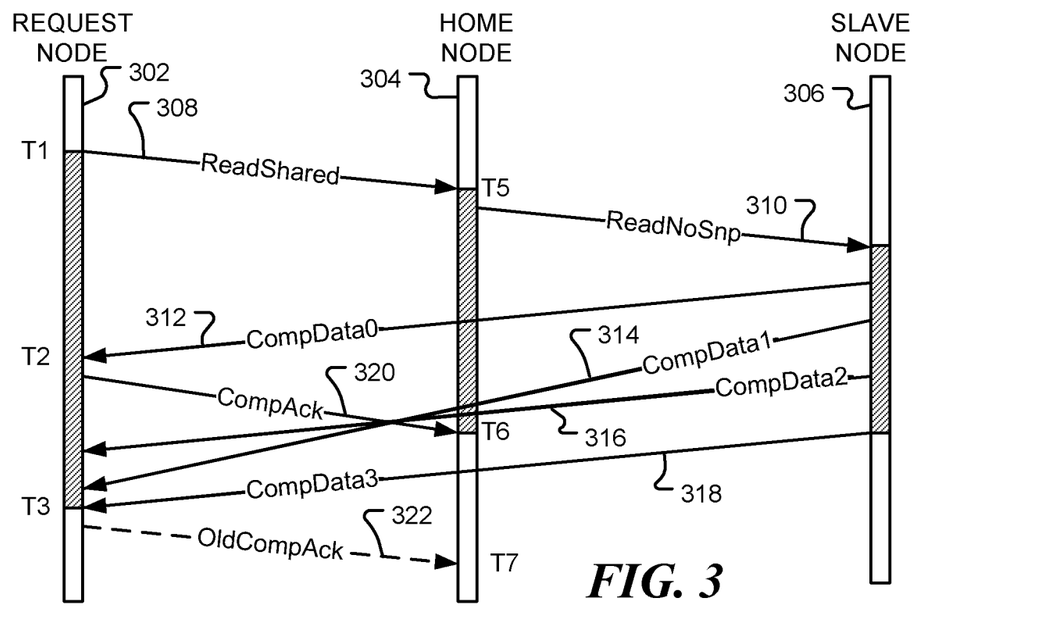
FIGS. 3-4 are transaction flow diagrams for data access, in accordance with various representative embodiments.
Figure 4:
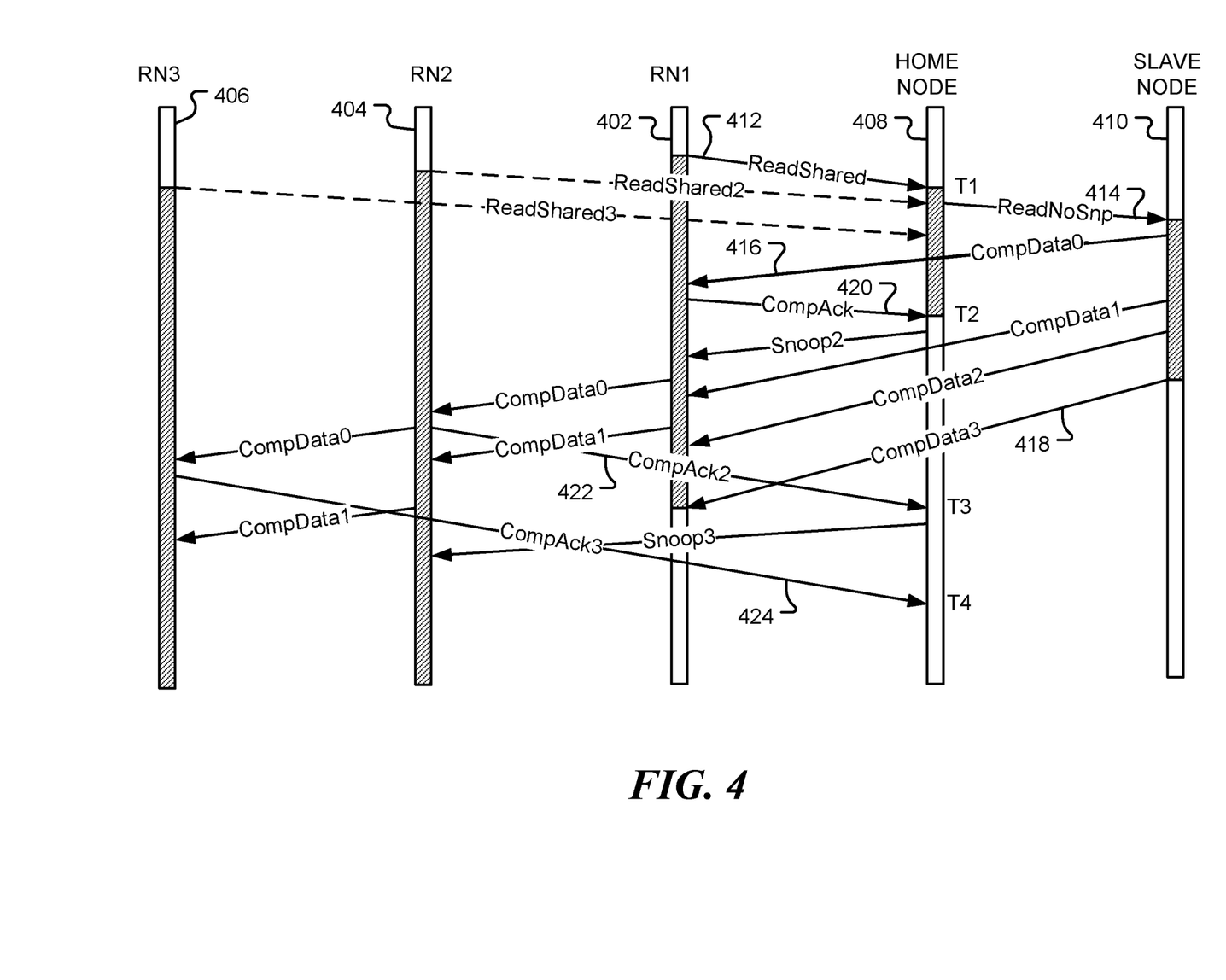

FIGS. 3-4 are transaction flow diagrams of a mechanism for data access in a data processing network, in accordance with various representative embodiments. The figures and the associated discussion below, describes the transaction structure and the dependencies that exist within an example transaction. The figures show the dependencies for a transaction with a separate Data and Home response.

FIG. 3 is a transaction flow diagram for data access in a data processing network, in accordance with various representative embodiments. Analogous to FIG. 2, in FIG. 3, vertical bars 302, 304 and 306 show time lines for a Request Node (RN), Home Node (HN) and Slave Node (SN), respectively, with time flowing from top to bottom. At time T1, RN issues Read request 308 to the Home Node for the read address. If the requested data is not in the cache of the HN, ReadNoSnp request 310 is sent to the appropriate SN (such as a memory controller, for example). The SN sends the requested data to the RN (in four data beats—312, 314, 316, 318). It is noted that the beats may arrive out of order having taken different routes through the interconnect. In the mechanism shown in FIG. 2, the RN sends CompAck 320 to the HN at time T2 when the first data has arrived at the RN. When the HN receives CompAck 320, it releases resources allocated to the Read transaction. The resources of the HN are in use for the time period T5-T6. In contrast, using the mechanism shown in FIG. 2, the CompAck 322 would have been sent at time T3. The resources of the HN would have been occupied for the time period T5-T7, which is considerably longer than the period T5-T6 for the disclosed mechanism.

Once the transaction is completed in the I-IN (i.e., at time T6), the I-IN is free to send a snoop message, if so requested, arriving at the RN. The RN is aware that data has been requested for the snooped address(es) and delays processing the snoop message until time T3, when all the requested data has been received by the RN. When the RN gives a CompAck acknowledgement, the RN is indicating that it will accept responsibility to handle snoop hazards for any transaction that is scheduled after it.

As before, if the requested data is present in the cache of the HN, the data is sent directly from the HN to the RN and no messages are exchanged with the SN.

The mechanism shown in FIG. 3 reduces the time period over which resources of the HN are allocated to the Read transaction, thereby allowing for an increase in overall system performance.

FIG. 4 is a further transaction flow diagram for data access in a data processing network, in accordance with various representative embodiments. In FIG. 4, vertical bars 402, 404 and 406 depict time lines for Request Nodes RN1, RN2 and RN3 while vertical bars 408 and 410 depict time lines for a Home Node (HN) and a Slave Node (SN), respectively, with time flowing from top to bottom. At time T1, HN receives a ReadShared request 412 from RN1 for a read address. Subsequently, HN receives requests, denoted as ReadShared2 and ReadShared3 from RN2 and RN3, respectively. The HN acts as a Point of Serialization (PoS) and processes these requests in the order in which they are received. The I-IN also acts as Point of Coherency (PoC) and performs a coherency action when request 412 is received. In the example shown, the HN sends ReadNoSnp message 414 to the Slave Node. In response, the SN sends the requested data in four beats, denoted as Compdata0 (416), CompData1, CompData2 and CompData3 (418), to the requesting node RN1. When the first data beat (CompData0, 416) is received at RN1, RN1 sends a CompAck 420 message to the HN, as discussed above with reference to FIG. 3. The HN receives the CompAck message 420 at time T2 and is then able to free resources allocated to the Read transaction. In particular, HN is permitted to send snoop requests, such as Snoop2, to RN1.

When RN2 and RN3 have requested the same shared data as RN1, the data is forwarded from RN1. When Compdata0 arrives at RN2, RN2 sends a CompAck message 422, denoted as CompAck2, to HN. The HN receives the CompAck2 message 422 at time T3 and is then permitted to send snoop requests, such as Snoop3, to RN2. Similarly, when Compdata0 arrives at RN3, RN3 sends a CompAck message 424, denoted as CompAck3, to HN. The HN receives the CompAck3 message 424 at time T4 and is then permitted to send snoop requests to RN3. In this way, resources of HN are only allocated for the time period T1-T2.

When an RN provides data in response to a snoop before all beats of data are received for its own request, the received data is treated with certain constraints. These constraints are dependent on the type of snoop.

When the snoop is non-invalidating and not a 'snoop once' message, the line may be used and cached in shared state at the Request Node. The cached copy must not be modified by the Request Node.

When the snoop is a 'snoop once' message, the line can be used and may be cached in any state and modified at the Request Node.

When the Snoop is an invalidating snoop, the received data can be used only once and dropped and must not be cached.

In all the above cases, when the Request Node's request was a result of a store from the core then the received data can be modified but the modified data should be forwarded in the snoop response. Modified data can be cached if the snoop is non-invalidating, but the modified data should not be cached if the snoop is the invalidating type.

The disclosed mechanism allows the Home Node to release resources with hazards and other transaction resources early, enabling the Home Node resources to be optimally utilized with minimum overhead. Also, this scales well with system size since the interconnect size, and thus increased data packet traversal latencies, do not require Home Node resources to be increased proportionately.

Figure 5:
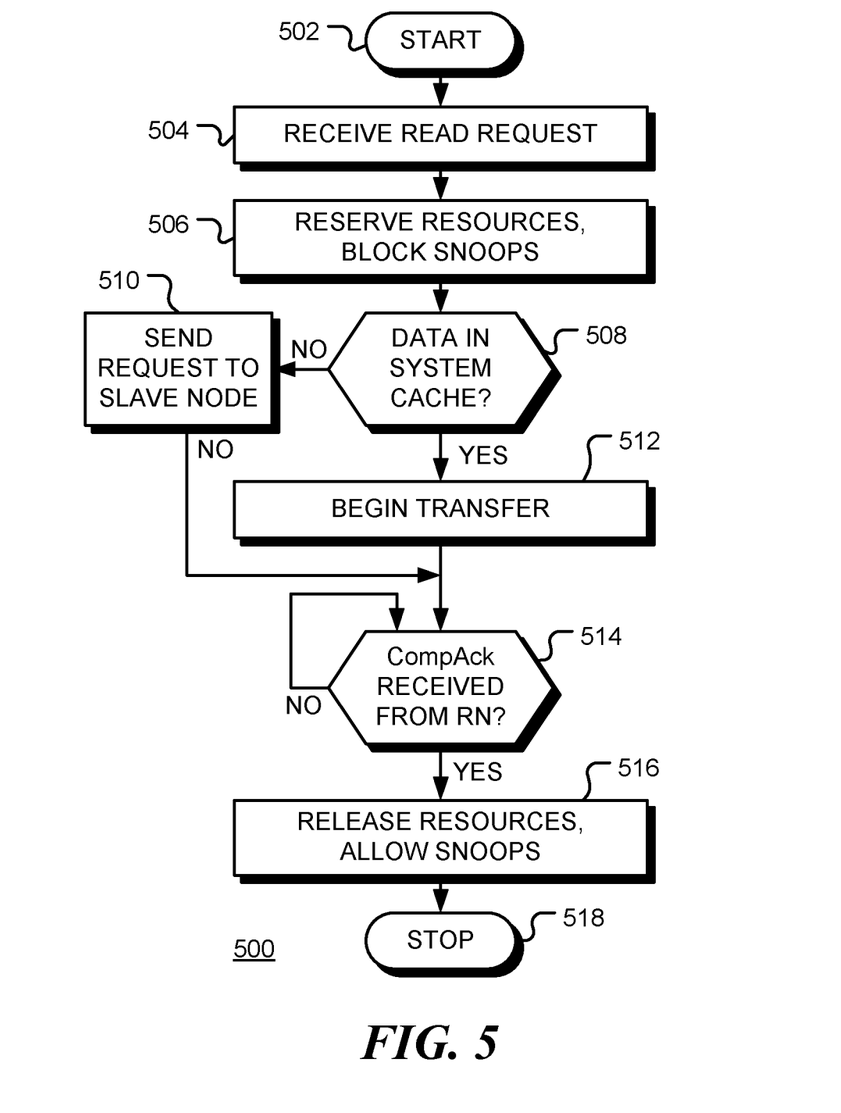
FIG. 5 is a flow chart of a method of operation of a Home Node of a data processing network, in accordance with various representative embodiments.

FIG. 5 is a flow chart of a method of operation 500 of a Home Node in a data processing network in accordance with representative embodiments. Following start block 502, a read request is received by the I-IN at block 504. At block 506, resources are reserved within the HN and snoops to the requested read address(es) are blocked. If the requested data is not present in the system cache of the HN, as depicted by the negative branch from decision block 508, a request (ReadNoSnp, for example) for the data is sent to the appropriate Slave Node at block 510. Otherwise, as depicted by the positive branch from decision block 508, transfer of the date from the system cache begins a block 512. The HN waits at decision block 514 until a CompAck message is received from the RN, indicating that the first data has arrived. When the CompAck message is received, as depicted by the positive branch from decision block 514, the HN releases its allocated resources and enables the sending of snoops to the RN at block 516. The HN participation in the transaction is then complete, as indicated by termination block 518.

FIG. 5 shows an embodiment of a method of data transfer in a data processing network. A Home Node receives, at a first time, a request to read data at a first address in the network, where the request has been sent via the coherent interconnect from a Request Node of the data processing network. The Home Node performs a coherence action for the data at the first address dependent upon a presence of copies of the requested data in the data processing network. This may involve sending snoop messages to devices of the network having copies of the requested data. The coherence state of the data copies may be changed and/or the data may be written back to a memory, for example. The Home Node then causes the requested data to be transmitted to the Request Node in a plurality of data beats. For example, the data may be transmitted from the Home Node when it is present in a system cache of the Home Node. Alternatively, the data may be transmitted from another Request Node having a copy of the data or from a Slave Node, such as a memory management unit. When the first data beat is received by the Request Node, it sends an acknowledgement message to the Home Node. In a time period between the first time and the second time, the Home Node may receive data requests from other Request Nodes for data at the first address. However, the Home Node does not send any snoop request to the Request Node for the data during this time period.

Subsequent to the second time, the Home Node allows snoop requests for data at the first address to be sent to the Request Node.

When the Home Node receives the read request from the Request Node it allocates resources of the Home Node to enable performance of the coherency action and control of snoop messages. Once the acknowledgement message is received from the Request Node, acknowledging receipt of a first beat of the plurality of data beats, the resources of the Home Node are freed.

In contrast, in prior systems, the Request Node does not acknowledge receipt of the requested data until all data beats have been received. As a result, Home Node resources are used for a longer time period.

When a read request is received by the Home Node, the Home Node determines one or more locations where copies of the requested data are stored in the data processing network. This information may be stored in a presence vector of an entry in a snoop filter, for example. When the requested data is stored in a cache of the Home Node, the plurality of data beats are transferred from the Home Node to the Request Node via the coherent interconnect. When the requested data is stored at a different network node (such as Slave Node or another Request Node), the Home Node sends a request for the data beats to be sent from that node to the Request Node.

Figure 6:
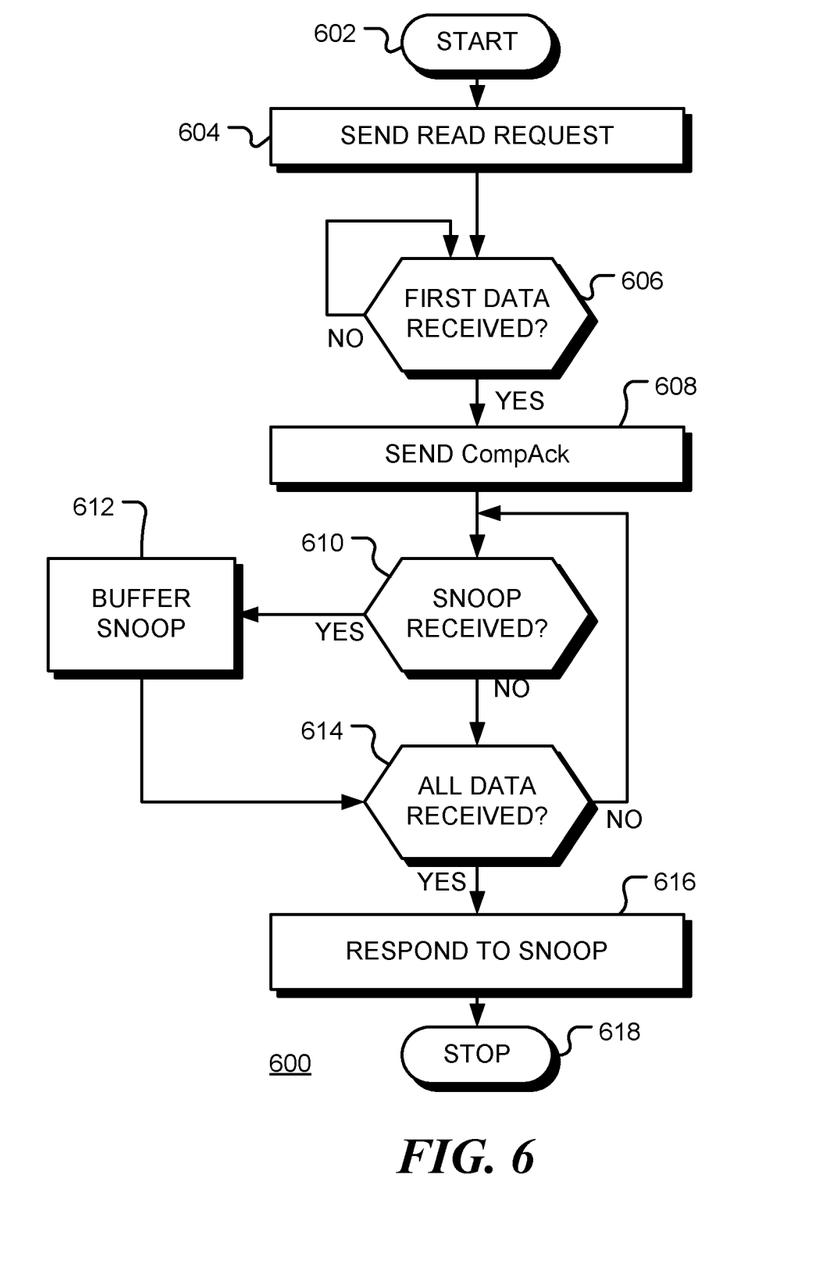
FIG. 6 is a flow chart of a method of operation of a Request Node of a data processing network, in accordance with various representative embodiments.

FIG. 6 is a flow chart of a method of operation 600 of a Request Node in a data processing network in accordance with representative embodiments. Following start block 602, a read request is sent to a HN at block 604. The RN then waits at decision block 606 until the first data is received in response to the read request. The data may be received from the HN or directly from an SN. When the first data is received, as depicted by the positive branch from decision block 606, a CompAck message is sent to the HN at block 608. Subsequently, when a snoop request is received, as depicted by the positive branch from decision block 610, the snoop is buffered at block 612 and no response is made. When all data associated with the read request has been received, as depicted by the positive branch from decision block 614, the RN responds to any buffered snoop messages at block 616 and the method terminates at block 618. In this manner, the CompAck message is sent before all data has been received, thereby free the HN sooner.

Figure 7:
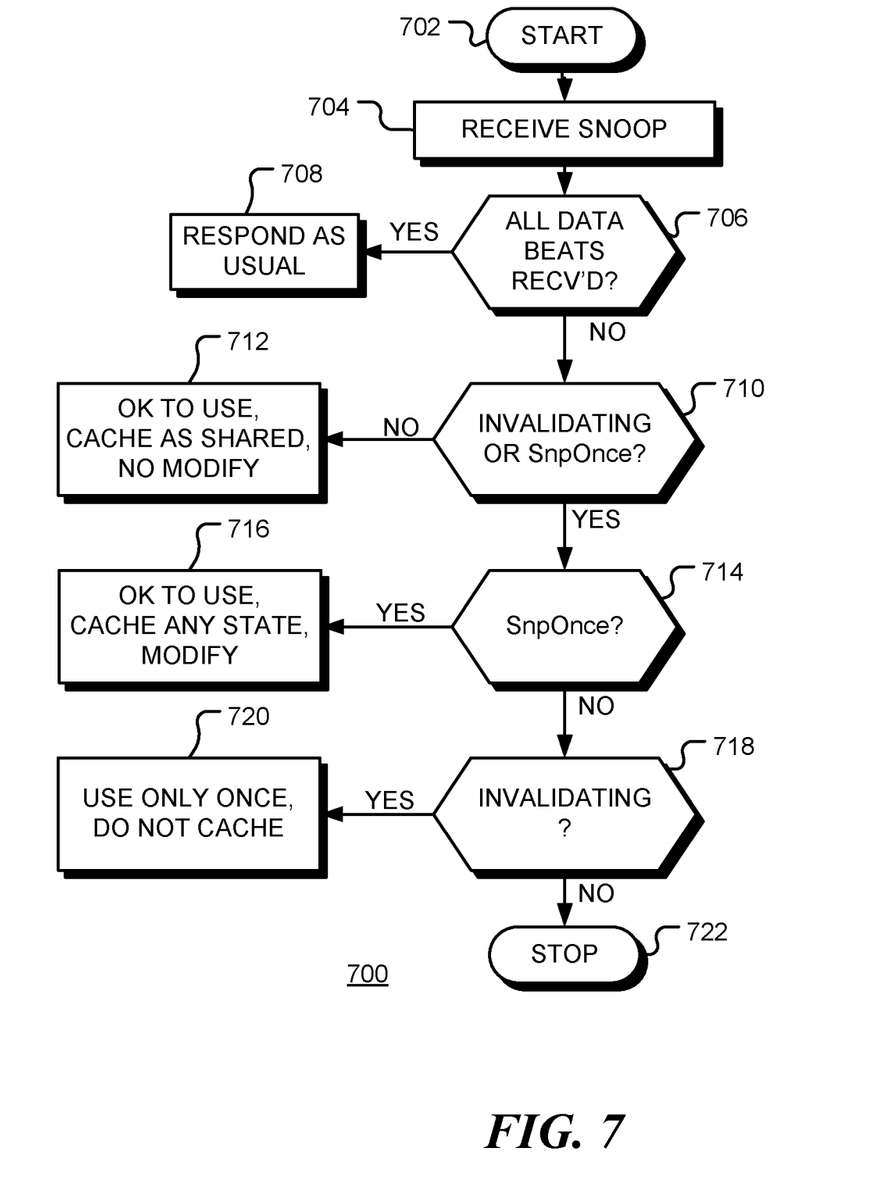
FIG. 7 is a flow chart of a further method of operation of a Request Node of a data processing network, in accordance with various representative embodiments.

In an alternative embodiment, as shown in FIG. 7, the RN may provide data in response to a snoop before all beats of data are received for its own request, the received data is treated with certain constraints. These constraints are dependent on the type of snoop.

FIG. 7 is a flow chart of a method 700 for responding to snoops in a Request Node, in accordance with embodiments of the disclosure. Following start block 702 in FIG. 7, a snoop is received by the RN at block 704, following a request for data by the RN. If all beats of the requested data have been received, as depicted by the positive branch from decision block 706, the snoop is responded to in the usual manner at block 708. Otherwise, as depicted by the negative branch from decision block 706, the RN applies certain constraints to the data. If the snoop is not an invaliding snoop or a snoop once request, as depicted by the negative branch from decision block 710, the RN may use the requested data. The data may be cached as shared and the cached data cannot be modified by the RN, as shown in block 712. When the snoop is a snoop once message, as depicted by the positive branch from decision block 714, the data can be used and may be cached in any state and modified at the Request Node, as shown in block 716. When the Snoop is an invalidating snoop, as depicted by the positive branch from decision block 718, the received data can be used only once and dropped and must not be cached, as shown in block 720, otherwise the method terminates at block 722. In all the above cases, when Request Node's request was a result of a store from the core then the received data can be modified but the modified data should be forwarded in the snoop response. The modified data can be cached if the snoop is non-invalidating, but should not be cached if the snoop is the invalidating type.

FIG. 6 and FIG. 7 show embodiments of a method of data transfer in a data processing network, consistent with the present disclosure. In accordance with embodiments of the disclosure, a Request Node of the data processing network sends a request to read data at a first address in the network. The request is sent via a coherent interconnect to a Home Node of the data processing network. A system address map may be used to determine which Home Node the request should be sent to. In response to the request, the Request Node receives a plurality of data beats of the requested data via the coherent interconnect, where a first data beat of the plurality of data beats is received at a first time and a last data beat of the plurality of data beats is received at a second time subsequent to the first time. Responsive to receiving the first data beat, the Request Node sends an acknowledgement message to the Home Node via the coherent interconnect, and, subsequent to sending the acknowledgement message to the Home Node, the Request Node accepts snoop messages from the Home Node.

In contrast, in prior systems, an acknowledgement message is not sent until all data beats have been received by the Request Node, and the Home Node refrains from sending snoops for the first address to the Request Node during this period.

After the acknowledge message has been received by the Home Node, the home is free to send snoop messages for the first address (or any other address) to the Request Node. In one embodiment, the time period between the first time and the second time, the Request Node buffers any snoop requests from the Home Node for the data at the first address. The Request Node processes these snoop messages after the last data beat of the plurality of data beats has been received by the Request Node. In a further embodiment, when (during the time period between the first time and the second time) a snoop request is received from the Home Node for the data at the first address, the Request Node forwards data beats of the requested data as they are received by the Request Node. In this embodiment, the forwarded data arrives at its target destination sooner than it would have done if the Request Node or Home Node had waited for all data beats to be received before servicing another request.

In accordance with certain embodiments, a snoop request for data at the first address is received by the Request Node during the time period between the first time and the second time, the received data handled in various ways by the Request Node, as shown in FIG. 7, for example. When the snoop request is neither a 'snoop once' request nor an 'invalidating' request, the Request Node is configured to use, modify and cache the received data. When the snoop request is a 'snoop once' request, the Request Node is configured to use the received data, and cache the received data in a 'shared' state, but not modify the data.

When the snoop request is an 'invalidating' request, the Request Node is configured to use, but not cache, the data.

Figure 8:
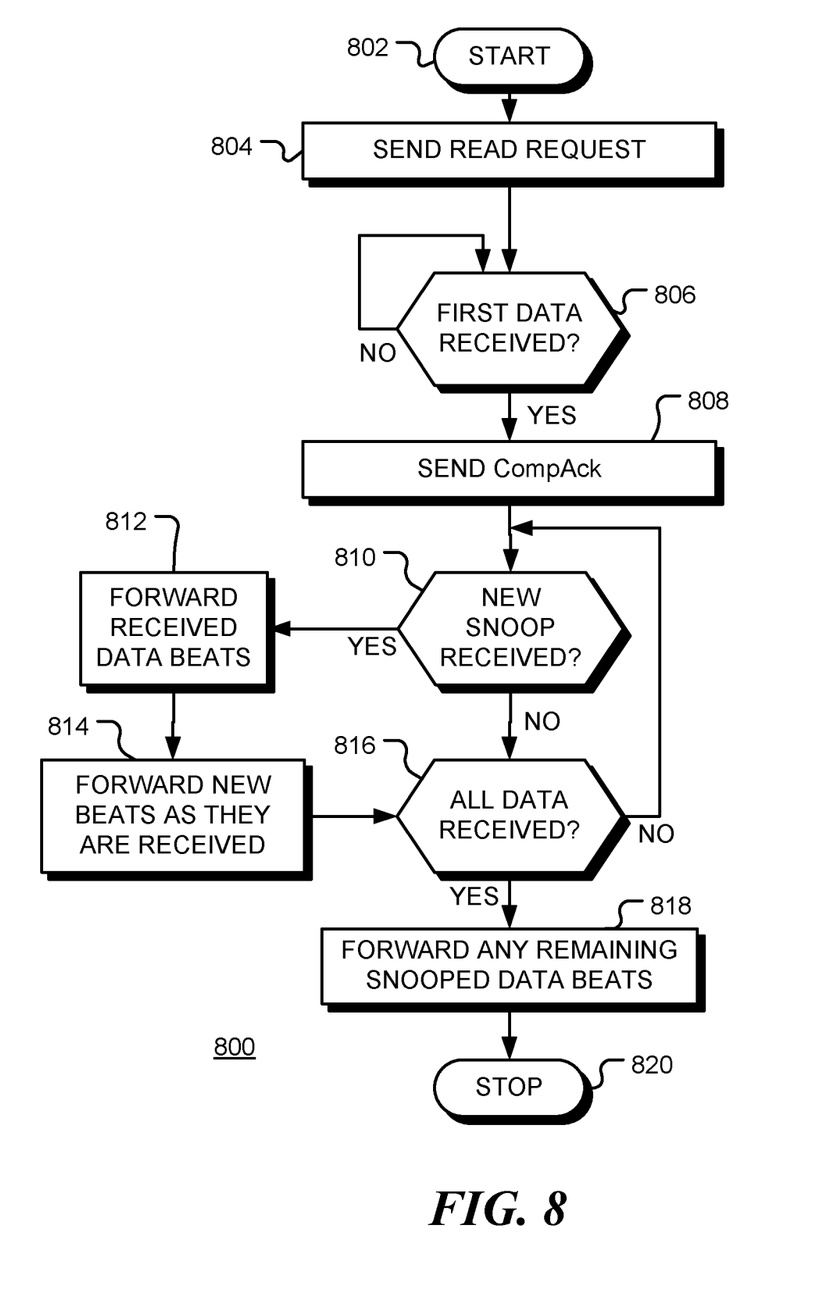
FIG. 8 is a flow chart of a still further method of operation of a Request Node of a data processing network, in accordance with various representative embodiments.

FIG. 8 is a flow chart of a method of operation 800 of a Request Node of a data processing network, in accordance with various representative embodiments. The method corresponds to an operation of Request Node RN1 in the transaction flow diagram shown in FIG. 4, for example.

Following start block 802 in FIG. 8, a read request is sent to a HN at block 804. The RN then waits at decision block 806 until the first data is received in response to the read request. The data may be received from the HN or directly from an SN or another RN. When the first data beat is received, as depicted by the positive branch from decision block 806, a CompAck message is sent to the HN at block 808. Subsequently, when a new snoop request is received (for the data requested at block 804), as depicted by the positive branch from decision block 810, the received data beat (or beats) are forwarded to the target node indicated in the snoop at block 812. Subsequently, when additional data beats are received by the RN, the data beats are forwarded to the target node, as depicted by block 814. When all data beats associated with the read request has been received, as depicted by the positive branch from decision block 816, the RN forwards any remaining data beats to the snoop target(s) at block 818 and the method terminates at block 820. In this manner, the CompAck message is sent before all data has been received, thereby freeing the HN sooner.

Those skilled in the art will recognize that the present disclosure has been described in terms of exemplary embodiments. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described by instructions of a Hardware Description Language or by netlist of components and connectivity. The instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the disclosed present disclosure.

One embodiment provides a method of data transfer in a data processing network. The method includes: sending, by a Request Node of the data processing network, a request to read data at a first address in the network, the request sent via a coherent interconnect to a Home Node of the data processing network that is associated with the first address; receiving, by the Request Node via the coherent interconnect, a plurality of data beats of the requested data, where a first data beat of the plurality of data beats is received at a first time and a last data beat of the plurality of data beats is received at a second time subsequent to the first time; responsive to receiving the first data beat, the Request Node sending an acknowledgement message to the Home Node via the coherent interconnect; and subsequent to sending the acknowledgement message to the Home Node, the Request Node accepting snoop messages for the first address from the Home Node.

The method may also include: buffering, by the Request Node, a snoop request for data at the first address received from the Home Node, when the snoop request received in the time period between the first time and the second time.

The method may also include: the Request Node sending data in response to the snoop request after the last data beat of the plurality of data beats has been received by the Request Node.

The method may also include, responsive to a snoop request for data at the first address received by the Request Node in a time period between the first time and the second time: forwarding, by the Request Node, data beats of the requested data received by the Request Node.

The plurality of data beats may be received by the Request Node via the coherent interconnect from a Slave Node of the data processing system, from a further Request Node of the data processing system, or from the Home Node.

The method may also include: requesting, by the Home Node, the data to be sent from the Slave Node to the Request Node via the coherent interconnect.

The plurality of data beats may be sent from the further Request Node responsive to a snoop message received at the further Request Node from the Home Node.

The method may also include, responsive to a snoop request for data at the first address received by the Request Node in a time period between the first time and the second time: when the snoop request is neither a 'snoop once' request nor an 'invalidating' request, configuring the Request Node to use, modify and cache the received data; and when the snoop request is a 'snoop once' request, configuring the Request Node to use the received data, and cache the received data in a 'shared' state, but not modify the data; and when the snoop request is an 'invalidating' request, configuring the Request Node to use but not cache the data.

A further embodiment implements a method of data transfer in a data processing network. The method includes: receiving at a first time, by a Home Node of the data processing network, a request to read data at a first address in the network, the request sent via a coherent interconnect from a Request Node of the data processing network, where the Home Node is associated with the first address; performing, by the Home Node, a coherence action for the data at the first address dependent upon a presence of copies of the requested data in the data processing network; causing, by the Home Node, the requested data to be transmitted to the Request Node in a plurality of data beats; receiving at a second time, by the Home Node, an acknowledgement message from the Request Node acknowledging receipt of a first beat of the plurality of data beats; in a time period between the first time and the second time, the Home Node not sending any snoop request to the Request Node for data at the first address; and subsequent to the second time, the Home Node allowing snoop requests for data at the first address to be sent to the Request Node.

The method may also include: allocating, by the Home Node responsive to receiving the request, resources of the Home Node to the read request from the Request Node; and freeing, by the Home Node, the resources of the Home Node responsive to receiving the acknowledgement message from the Request Node acknowledging receipt of the first beat of the plurality of data beats.

The method may also include: determining, by the Home Node, one or more locations of the requested data in the data processing network; transferring, by the Home Node, the plurality of data beats to the Request Node via the coherent interconnect when the requested data is stored in a cache of the Home Node; and sending, by the Home Node, a request to a further node of the data processing network when the requested data is stored at the further node.

The further node may be a further Request Node having a copy of the requested data or a Slave Node of the data processing network.

A further embodiment relates to a data processing network comprising: one or more Request Nodes configured to access a shared data resource; a Home Node that provides a point of coherency for data of the shared data resource; a coherent interconnect configured to couple between the one or more Request Nodes and the Home Node; where a Request Node of the one or more Request Nodes is configured to perform a method comprising: sending a request to read data at a first address in the shared data resource to the Home Node; receiving a plurality of data beats of the requested data, where a first data beat of the plurality of data beats is received at a first time and a last data beat of the plurality of data beats is received at a second time subsequent to the first time; responsive to receiving the first data beat, sending an acknowledgement message to the Home Node; and subsequent to sending the acknowledgement message to the Home Node, accepting snoop messages from the Home Node, and where the Home Node is configured to perform a method comprising: receiving at a third time the request to read data at the first address; performing a coherence action for the data at the first address dependent upon locations of copies of the requested data in the data processing network; causing the requested data to be transmitted to the Request Node in the plurality of data beats; receiving at a fourth time, the acknowledgement message from the Request Node acknowledging receipt of the first beat of the plurality of data beats; in a time period between the third time and the fourth time, the Home Node not sending any snoop request to the Request Node for data at the first address; and subsequent to the fourth time, allowing snoop requests for data at the first address to be sent to the Request Node.

The Request Node may also be configured to buffer a snoop request from the Home Node for the data at the first address when the snoop request is received in the time period between the first time and the second time.

The Request Node may also be configured to send data in response to the snoop request after the last data beat of the plurality of data beats has been received.

Responsive to a snoop request from the Home Node for the data at the first address received in the time period between the first time and the second time, the Request Node may be configured to forward data beats of the requested data as they are received.

The Home Node may also be configured to allocate, responsive to receiving the request, resources of the Home Node to the read request from the Request Node, and configured to free the resources responsive to receiving the acknowledgement message from the Request Node acknowledging receipt of a first beat of the plurality of data beats.

A further embodiment provides a non-transitory computer readable medium that stores instructions of a Hardware Description Language, the instructions descriptive of the data processing network.

A still further embodiment provides a non-transitory computer readable medium that stores a netlist of components and connectivity of the data processing network.

We claim:

1. A method of data transfer in a data processing network, the method comprising:
   sending, by a Request Node of the data processing network, a request to read data at a first address in the network, the request sent via a coherent interconnect to a Home Node of the data processing network that is associated with the first address;

receiving, by the Request Node via the coherent interconnect, a plurality of data beats of the requested data, where a first data beat of the plurality of data beats is received at a first time and a last data beat of the plurality of data beats is received at a second time subsequent to the first time;

responsive to receiving the first data beat and prior to receiving the last data beat, the Request Node sending an acknowledgement message to the Home Node via the coherent interconnect; and subsequent to sending the acknowledgement message to the Home Node and prior to the second time, the Request Node accepting snoop requests for the first address from the Home Node.

2. The method of claim 1, further comprising:

subsequent to the Home Node receiving the acknowledgement message from the Request Node and prior to the second time, the Home Node sending a snoop request for data at the first address to the Request Node; and buffering, by the Request Node, the snoop request for data at the first address received from the Home Node.

3. The method of claim 2, further comprising:

the Request Node sending data in response to the snoop request after the last data beat of the plurality of data beats has been received by the Request Node.

4. The method of claim 1, further comprising:

subsequent to the Home Node receiving the acknowledgement message from the Request Node and prior to the second time, the Home Node sending a snoop request for the data at the first address to the Request Node; and responsive to the snoop request for data at the first address being received by the Request Node before the second time:

forwarding, by the Request Node before the second time, data beats of the requested data received by the Request Node.

5. The method of claim 1, where the plurality of data beats are received by the Request Node via the coherent interconnect from a Slave Node of the data processing system, from a further Request Node of the data processing system, or from the Home Node.

6. The method of claim 5, further comprising:

requesting, by the Home Node, the data to be sent from the Slave Node to the Request Node via the coherent interconnect.

7. The method of claim 5, where the plurality of data beats are sent from the further Request Node responsive to a snoop request received at the further Request Node from the Home Node.

8. The method of claim 1, further comprising, responsive to a snoop request for data at the first address received by the Request Node in a time period between the first time and the second time:

when the snoop request is neither a 'snoop once' request nor an 'invalidating' request, configuring the Request Node to use, modify and cache the received data; and when the snoop request is a 'snoop once' request, configuring the Request Node to use the received data, and cache the received data in a 'shared' state, but not modify the data; and when the snoop request is an 'invalidating' request, configuring the Request Node to use but not cache the data.

9. A method of data transfer in a data processing network, the method comprising:

receiving at a first time, by a Home Node of the data processing network, a request to read data at a first address in the network, the request sent via a coherent interconnect from a Request Node of the data processing network, where the Home Node is associated with the first address;

performing, by the Home Node, a coherence action for the data at the first address dependent upon a presence of copies of the requested data in the data processing network;

causing, by the Home Node, the requested data to be transmitted to the Request Node in a plurality of data beats;

receiving at a second time, by the Home Node, an acknowledgement message from the Request Node acknowledging receipt of a first beat of the plurality of data beats, the second time prior to receipt of a last data beat of the plurality of data beats by the Request Node;

in a time period between the first time and the second time, the Home Node not sending any snoop request to the Request Node for data at the first address; and subsequent to the second time, the Home Node allowing snoop requests for data at the first address to be sent to the Request Node.

10. The method of claim 9, further comprising:

allocating, by the Home Node responsive to receiving the request, resources of the Home Node to the read request from the Request Node; and freeing, by the Home Node, the resources of the Home Node responsive to receiving the acknowledgement message from the Request Node acknowledging receipt of the first beat of the plurality of data beats.

11. The method of claim 9, further comprising:

determining, by the Home Node, one or more locations of the requested data in the data processing network;

transferring, by the Home Node, the plurality of data beats to the Request Node via the coherent interconnect when the requested data is stored in a cache of the Home Node; and sending, by the Home Node, a request to a further node of the data processing network when the requested data is stored at the further node.

12. The method of claim 11, where the further node comprises a further Request Node having a copy of the requested data or a Slave Node of the data processing network.

13. A data processing network comprising:

one or more Request Nodes configured to access a shared data resource;

a Home Node that provides a point of coherency for data of the shared data resource;

a coherent interconnect configured to couple between the one or more Request Nodes and the Home Node;

where a Request Node of the one or more Request Nodes is configured to perform a method comprising:

sending a request to read data at a first address in the shared data resource to the Home Node;

receiving a plurality of data beats of the requested data, where a first data beat of the plurality of data beats is received at a first time and a last data beat of the plurality of data beats is received at a second time subsequent to the first time;

responsive to receiving the first data beat, sending an acknowledgement message to the Home Node; and subsequent to sending the acknowledgement message to the Home Node, accepting snoop requests from the Home Node, and where the Home Node is configured to perform a method comprising:
- receiving at a third time the request to read data at the first address;
- performing a coherence action for the data at the first address dependent upon locations of copies of the requested data in the data processing network;
- causing the requested data to be transmitted to the Request Node in the plurality of data beats;
- receiving at a fourth time, the acknowledgement message from the Request Node acknowledging receipt of the first beat of the plurality of data beats;
- in a time period between the third time and the fourth time, the Home Node not sending any snoop request to the Request Node for data at the first address; and
- subsequent to the fourth time, allowing snoop requests for data at the first address to be sent to the Request Node.

14. The data processing network of claim 13, where the Request Node is further configured to buffer a snoop request from the Home Node for the data at the first address when the snoop request is received in the time period between the first time and the second time.

15. The data processing network of claim 14, where the Request Node is further configured to send data in response to the snoop request after the last data beat of the plurality of data beats has been received.

16. The data processing network of claim 13, where, responsive to a snoop request from the Home Node for the data at the first address received in the time period between the first time and the second time, the Request Node is further configured to forward data beats of the requested data as they are received.

17. The data processing network of claim 13, where the Home Node is further configured to allocate, responsive to receiving the request, resources of the Home Node to the read request from the Request Node, and configured to free the resources responsive to receiving the acknowledgement message from the Request Node acknowledging receipt of a first beat of the plurality of data beats.

18. A non-transitory computer readable medium storing instructions of a Hardware Description Language, the instructions descriptive of the data processing network of claim 13.

19. A non-transitory computer readable medium storing a netlist of components and connectivity of the data processing network of claim 13.

* * * * *